O. E. SHEIDLER.
HOG CATCHER.
APPLICATION FILED APR. 16, 1914.
1,167,223.
Patented Jan. 4, 1916.
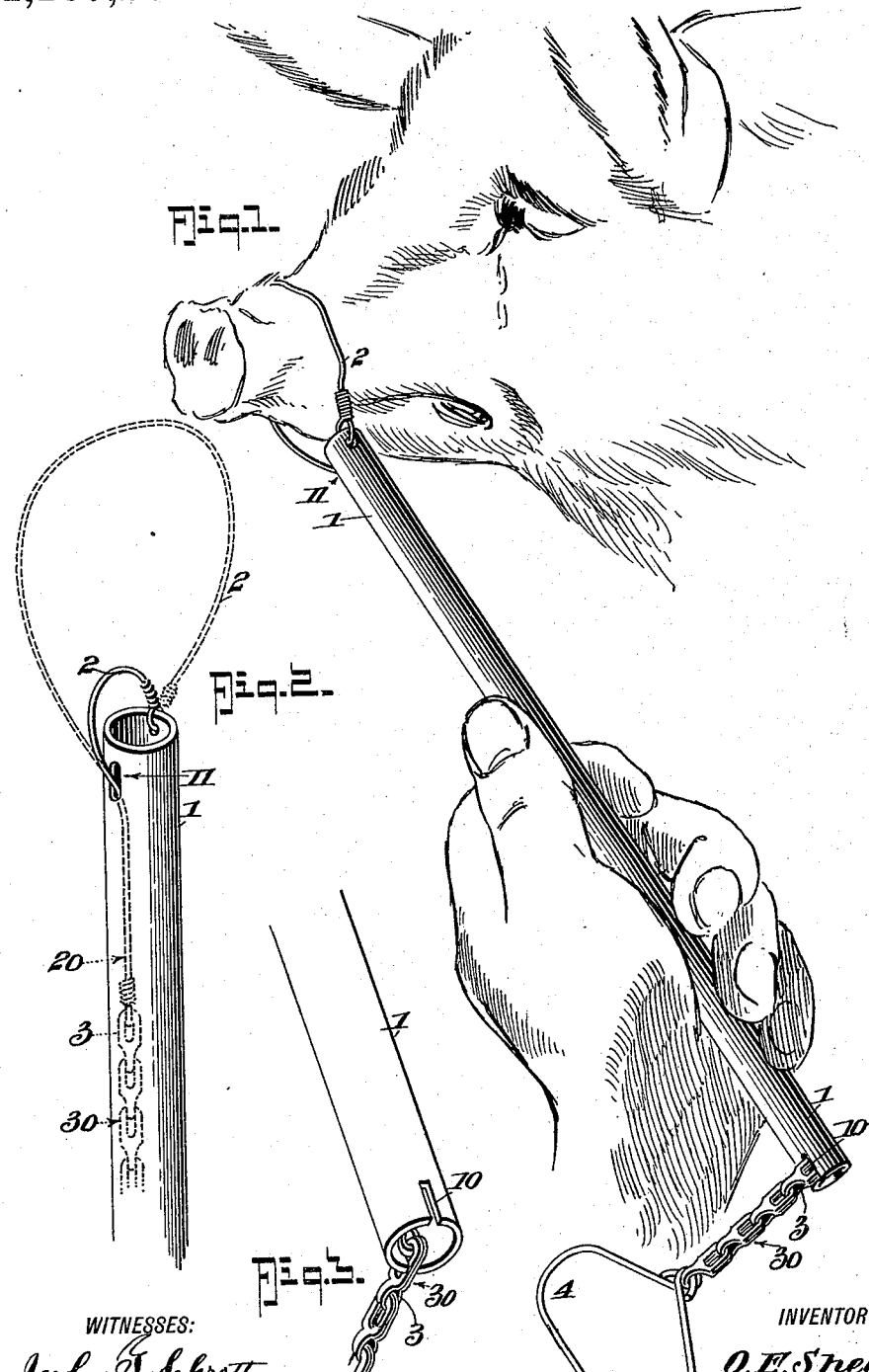
WITNESSES:
John T. Schrott
Charles J. Diller
INVENTOR
O. E. Sheidler
BY
Fred G. Dieterich
ATTORNEYS.
COLUMBIA PLANOGRAPH CO., WASHINGTON, D. C.

UNITED STATES PATENT OFFICE.

OLIVER E. SHEIDLER, OF OLD FORT, OHIO.

HOG-CATCHER.

1,167,223.  Specification of Letters Patent.  Patented Jan. 4, 1916.

Application filed April 16, 1914. Serial No. 832,274.

*To all whom it may concern:*

Be it known that I, OLIVER E. SHEIDLER, residing at Old Fort, in the county of Seneca and State of Ohio, have invented a new and Improved Hog-Catcher, of which the following is a specification.

My invention has reference to that class of devices or appliances utilized for catching hogs, sheep, poultry, etc., in which is included a handle or pole, means combined therewith including a catching member adapted for being slipped onto the object to be caught and held, and other means that coöperate with the catching member for holding the said catching member locked to its operative condition, so that the object caught cannot pull away.

My invention, which is more especially designed for catching hogs, primarily has for its object to provide a device of the general character stated of a very simple and economical construction, that can be readily used by any one, in which the parts are so arranged that after the catcher is applied, the hog can be securely held with one hand, and when applying the catcher the same will not hurt or injure the hog.

With other objects in view that will hereinafter appear my device embodies an improved arrangement of a tubular handle, a flexible loop mounted on one end thereof, means on the other end of the handle that connects and coöperates with the flexible loop member for pulling the said member taut when slipped over the hog's nose, and the said means also including connections for holding the loop locked to its drawn up or taut position.

In its more subordinate features, my invention consists in certain details of construction and novel arrangement of the parts hereinafter fully explained, specifically pointed out in the appended claim and illustrated in the accompanying drawing, in which:

Figure 1 is a perspective view of my invention, the same being shown as applied for use, the catcher or loop member being shown as held locked on the hog's nose. Fig. 2 is a perspective view of my hog catching device, the flexible catcher wire being shown extended in dotted lines and the manner of drawing it up and holding it locked to its drawn-up position, shown in full lines. Fig. 3 is a perspective view of the lever end of the tube, the pulling chain and the latter being shown in engagement with one of the locking notches in the tube or handle.

In carrying out my invention, the handle member is in the nature of a metal tube 1, the lower end of which has a plurality of longitudinally extending notches 10, preferably two, and they are disposed diametrically opposite each other, as shown.

The catcher portion, in my construction is in the nature of a piece of flexible wire 2, one end of which is made fast to one side of the upper end of the tubular member 1. The wire 2 passes over the upper end of the tube 1 and extends down through an elongated guide slot 11 in the upper end thereof and disposed diametrically opposite the point of connection of the wire with the tube. The end 20 of the wire 2, within the upper end of the tube 1, joins with a chain 3, composed of twisted links that include flat portions 30, the reason for which will presently appear.

The chain 3 extends through the lower end of the tube 1, and connects with a triangular shaped handle or pull member 4, preferably of stiff wire, as shown.

By reason of the peculiar manner in which the several parts, that constitute my invention are coöperatively combined, to apply the device for use, it is only necessary to pull out the flexible wire member 2 to form a catching loop. When thus adjusted, the same can be slipped over the nose of the hog without trouble, since the catcher 2, being of thin wire, the hog does not notice the same. After the catcher loop is slipped over the nose of the hog, the same can be instantly drawn taut by pulling on the hand or pull member 4, and the said loop or catcher member held locked by slipping a flat portion 30 of one of the chain links 3 into one of the locking notches 10 in the inner end of the handle or tube, as shown, it being obvious that when thus secured the hog can be easily held and led with one hand.

From the foregoing taken in connection with the accompanying drawing, the manner in which my device is operatively handled and its advantages will be readily apparent to those accustomed to the use of similar devices.

What I claim is:

In a hog catcher, a metal tube having a hole adjacent to one end at one side and a slot adjacent to the same end at the other side, a wire secured in said hole and looped and passed through said slot into said tube, a chain of flat links connected to said wire within said tube and projecting through the other end of the same, said tube at said other end having slots diametrically opposite each other and extending from the end longitudinally whereby to receive a flat link and retain the same, and a hand loop secured to the outside end of said chain all being arranged substantially as shown and for the purposes described.

OLIVER E. SHEIDLER.

Witnesses:
C. I. ANDERS,
C. C. DROIM.

Copies of this patent may be obtained for five cents each, by addressing the "Commissioner of Patents, Washington, D. C."